(No Model.)  3 Sheets—Sheet 1.
W. P. ABELL.
LEVER COTTON PRESS.
No. 335,871.  Patented Feb. 9, 1886.
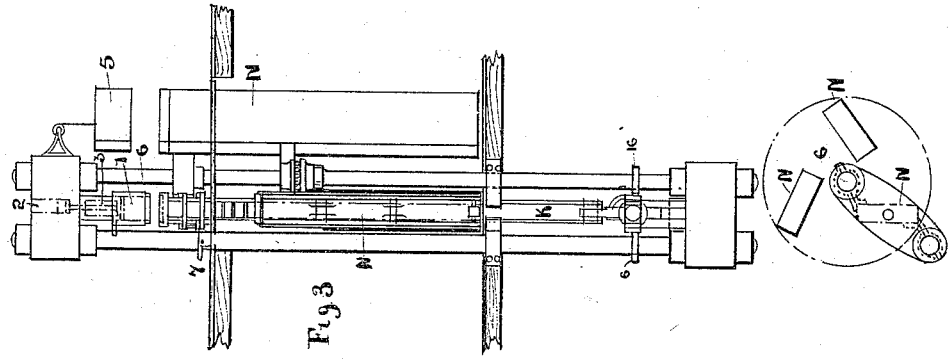
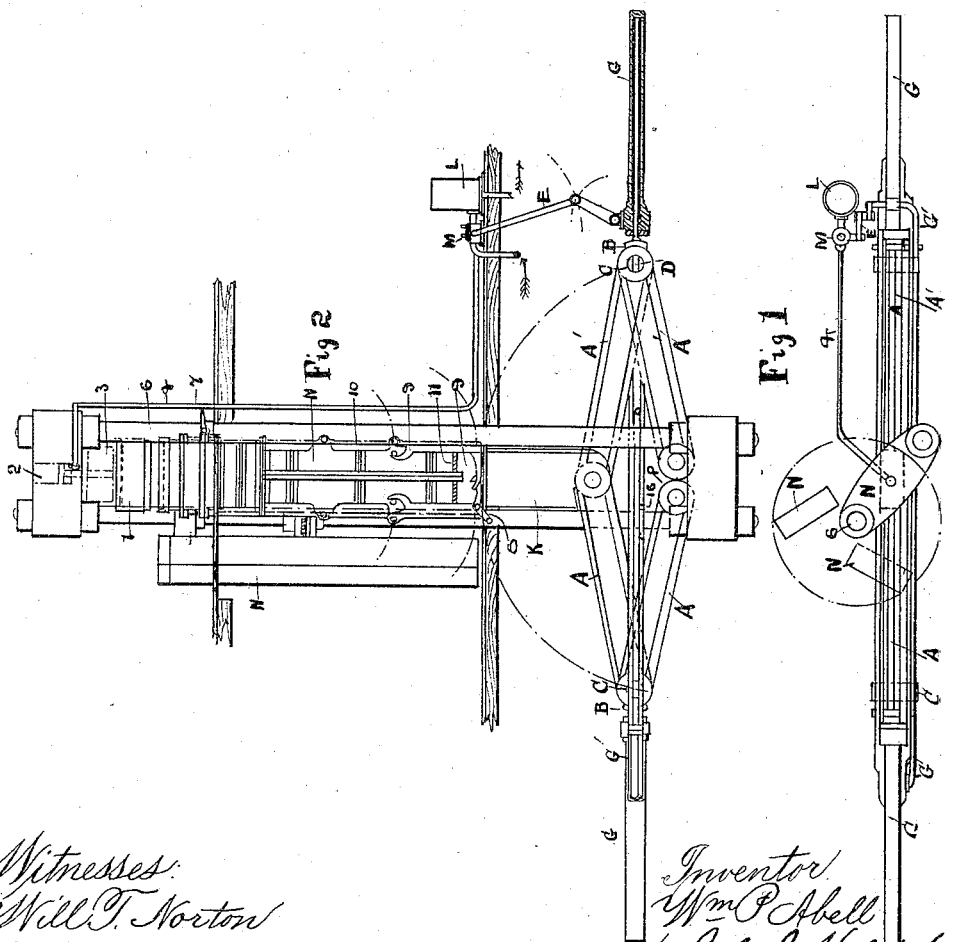
Witnesses:
Will T. Norton
R. B. Washington
Inventor
Wm P Abell
by John J. Halsted & Son
his Attys (No Model.) 3 Sheets—Sheet 2.
W. P. ABELL.
LEVER COTTON PRESS.
No. 335,871. Patented Feb. 9, 1886.
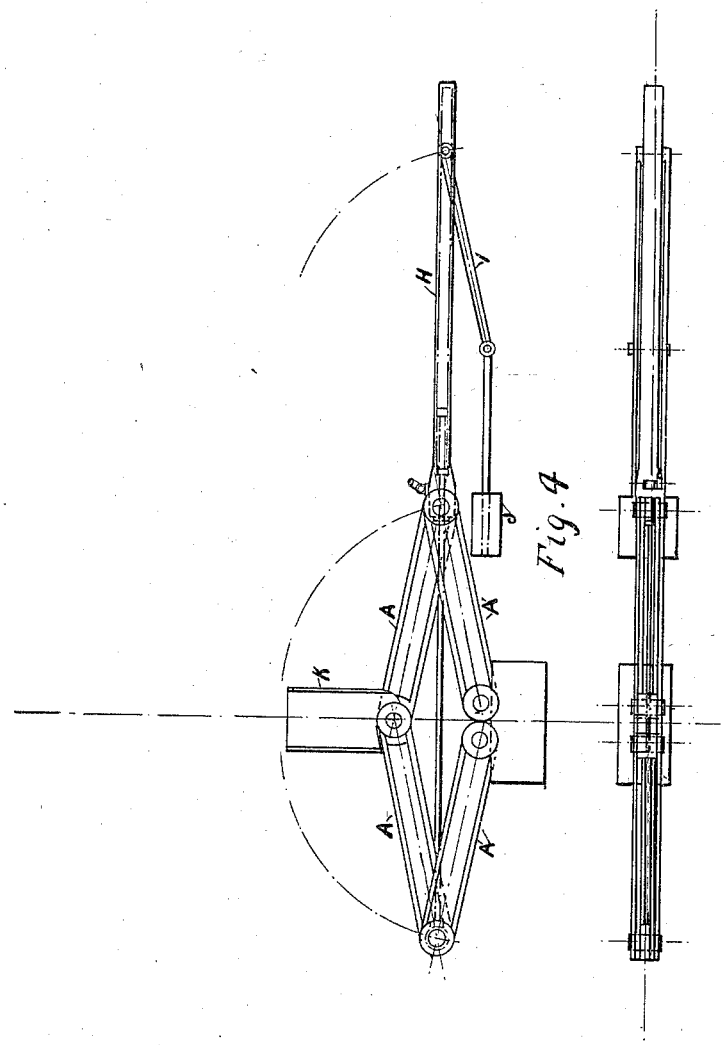

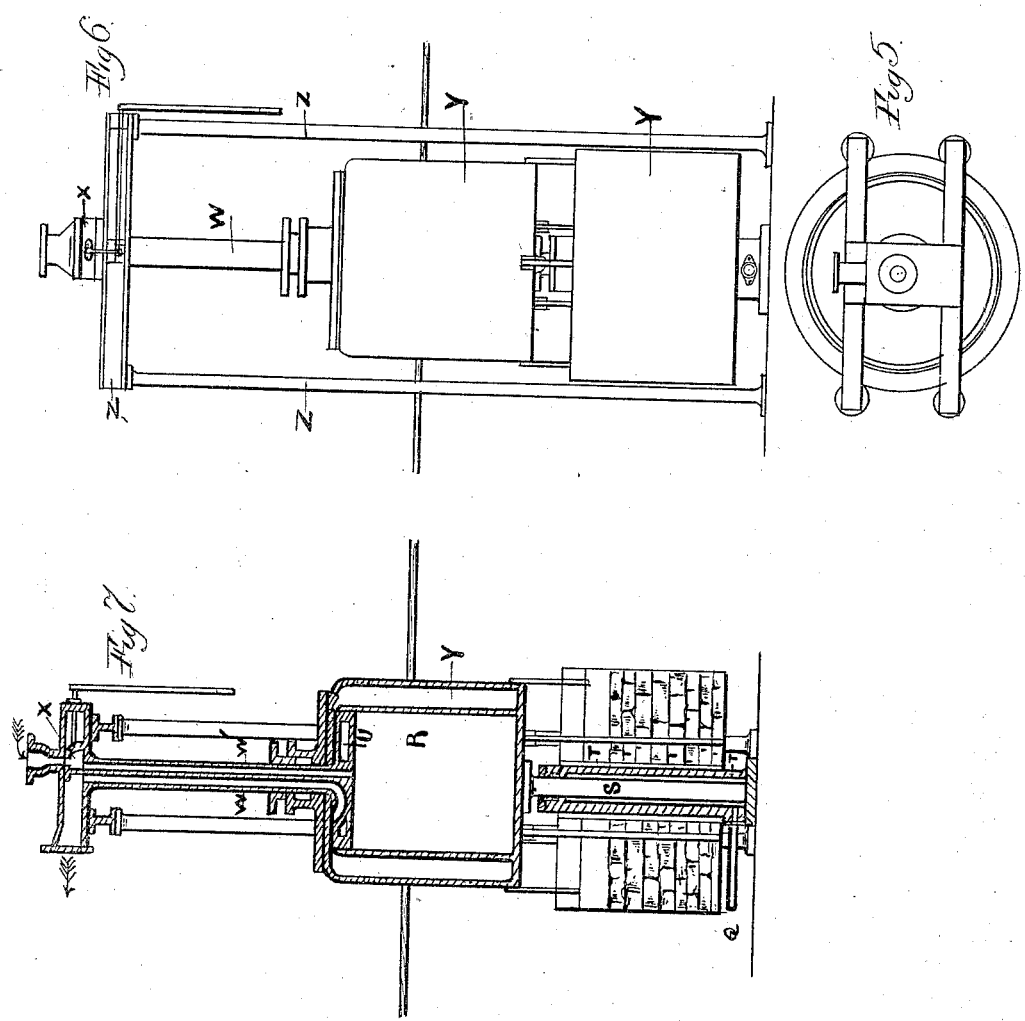

UNITED STATES PATENT OFFICE.

WILLIAM PRICE ABELL, OF KIRKBY LODGE, HINCKLEY, COUNTY OF LEICESTER, ENGLAND.

LEVER COTTON-PRESS.

SPECIFICATION forming part of Letters Patent No. 335,871, dated February 9, 1886.

Application filed July 11, 1885. Serial No. 171,341. (No model.)

*To all whom it may concern:*

Be it known that I, WILLIAM PRICE ABELL, a subject of the Queen of Great Britain, residing at Kirkby Lodge, Hinckley, in the county of Leicester, England, have invented new and useful Improvements in Lever Cotton-Presses, of which the following is a specification.

In pressing cotton and other materials into bales it is well known that to work economically the pressure should increase inversely with the size of the bale. This varying pressure has been most effectively realized by lever-presses involving the one-sided toggle-joint principle, having the varying pressure resulting from their contraction at the center, produced by either a fixed or oscillating cylinder and piston, which does not rise and fall bodily with the toggle-levers. This arrangement necessarily gives rise to great waste of power by the friction produced by the side thrust of the follower against the side nearest the cylinder, and also necessitating a heavy and strong box and column to withstand this side thrust.

This invention has for its object improvements in lever cotton-presses, whereby the above-named defects are obviated; and the improvements consist, mainly, in the use of double toggle-levers, with the cylinders and plungers arranged as hereinafter described, whereby the direction of the applied force always coincides with a straight line passing through the cylinder and the intersection of the levers with one another at the sides. The cylinders are braced together and rise and fall bodily with the said toggle-levers. An arrangement is provided for keeping the plungers at right angles to the longitudinal center line of the press. I also use an arrangement whereby a single cylinder is caused to rise bodily with the levers, thereby allowing the stress to act at right angles to the direction of the follower. For utilizing the potential energy of the levers, I employ a vessel containing a suitable elastic matter or gas, or a combination of steam-cylinder, weights, and casing. A top box part, raised by a piston or plunger, is provided, and, lastly, automatic catches for holding and releasing the ends of the box, to allow the levers to enter the box, all as hereinafter described.

In order to enable my invention to be fully understood, I will describe the same by reference to the accompanying drawings, in which—

Figure 1, Sheet 1, is a plan, Fig. 2, Sheet 1, a front elevation, and Fig. 3, Sheet 1, an end elevation, of a lever cotton-press constructed according to my improvements. Fig. 4, Sheet 1, is a detached view showing my arrangement of double toggle-levers applied to a single cylinder. Figs. 5, 6, and 7, Sheet 2, plan, elevation, and vertical section, respectively, of an arrangement of steam-cylinder, weights, and casing for utilizing the potential energy of the levers.

In Figs. 1, 2, and 3, A A A' A' are levers arranged on the double-toggle principle, the junction of the opposite ends of the levers at C C' moving in an arc on the fixed pins P. Both pairs of side levers are connected to the follower K, and by their extension force the follower into one of the boxes N as the sides of the levers contract.

The two pairs of levers A A and A' A', on each side, are connected together by the pins C and C'. These pins project through the steel or wrought-iron bars or braces D. These braces tie and rigidly connect the two cylinders G G together. These cylinders G G are of the ordinary construction, and of strength to withstand the necessary hydrostatic or pneumatic pressure. In these cylinders work ordinary plungers, which the fluid on entering the cylinders displaces. These plungers are so formed at their ends beyond the cylinders that they bear on the joints of the levers A A and A' A' at B B', and thus give out the pressure exerted on them in a line in the direction of the plunger centers and a line passing through the junction of the levers on each side. It will be obvious that as the cylinders are braced together and rise and fall with these joints B B' the direction of the applied force always coincides with a straight line passing through the centers of the cylinders G G' and the intersection of the levers A A and A' A' at C C'.

The cylinders G G' are supplied with the necessary fluid or air pressure through the swiveling pipe E, which is connected to the stop-valve of ordinary construction at M. This stop-valve determines the admission and release of power to the cylinders G G', and thus forms the center or controlling part of the press. The follower K is held or guided in its proper course by the guides L.

I sometimes find it advantageous to use only one cylinder H to the double toggle-levers A A A' A', as shown in Fig. 4, and in order that the conditions aforesaid can be fulfilled—videlicet, of applying the force at right angles to the extending end of the levers—and that the cylinder H may rise bodily with the lever-joints C C', the back end of the cylinder H is supported by the radial bar I, of a length equal to A and parallel to it, and balancing the cylinder H by the weight J. In the cylinder H works a piston connected to the rod O. The fluid or gas under pressure enters the cylinder H, as aforesaid, by the pipe E, pushes the piston to the back end of the cylinder, and thus by means of the rod O and junction of the cylinder H with the levers A A' draws the two pins C' C together, thus producing the necessary extension.

The valve M, Figs. 1 and 2, conducts the exhaust or waste water or gas from the cylinders into a receiver, L, of sufficient strength to withstand the pressure resulting from the weight of the levers, and of sufficient capacity to hold the contents of the two cylinders G G', or the cylinder H, as the case may be. The pumps of ordinary construction take their supply from the receiver L, as shown.

The operation is as follows: The receiver L is filled with air or some other suitable elastic gas or substance, and the cylinders G are pumped full till the levers A and A' have extended their full length in the box N. The pumps are then shut off, the weight of the extended levers forcing the water from the cylinders into the receiver L, and, as the mechanical efficiency of the levers on the plungers increases by virtue of their contraction, the water is forced into the receiver L under a pressure which varies inversely with the volume of the compressible substance contained in the said receiver L. Thus when the levers A A A' A' have contracted to their normal position, the receiver L is nearly full of fluid or air under pressure. The supply of the pumps being derived from this receiver, they have the supply during the commencement of the stroke under pressure. By this means the potential energy of the levers A A A' A', the follower, and also a certain amount of the elasticity of the cotton in its filling the bands is utilized by supplying the pumps with feed under pressure. I can also utilize this potential energy directly in the pump itself by the arrangement shown in Figs. 5, 6, and 7, Sheet 2, in which arrangement Q is connected to the swivel-pipe E by the stop-valve M to one of the cylinders G G', which is assumed to be full of water under pressure, the levers being extended and just finishing a bale. Now, this said pressure is derived from steam under pressure entering the hollow piston-rod W' by the valve X acting against a fixed piston, U, on a movable cylinder, R, connected to a ram, S, working in the hydraulic cylinder T. The steam-pressure on the cylinder R is also assisted in giving the necessary weight or pressure to the ram S by the weight or ballast V. Now, assuming the levers just about to descend, their potential energy is enabled to assist the same steam which gave the final pressure to raise the cylinder R and its weights V and ram S ready for another stroke by pushing the valve X over in such a position as to close the high-pressure steam-inlet and connect the cylinder R, full of high-pressure steam, with the casing Y, thus filling the two with expanded steam. The valve X is then pushed farther in the direction shown till it opens the cylinder R on the bottom side of the piston to the exhaust or atmosphere. This allows the steam under reduced pressure arising from its expansion, as explained, to act on the top side of the piston, and with the assistance of the potential energy of the levers A A A' A' raises the cylinder and weights ready for another stroke, the decreasing power resulting from the continued expansion of the steam being compensated for by the increasing mechanical advantage of the descending levers A A A' A' supplying the water under increasing pressure at Q. The fixed piston is carried by the girders and columns Z Z.

Instead of the doors or other arrangement hitherto used for releasing the bale and exposing it to be lashed or banded, I use, as shown in Figs. 1, 2, and 3, a plain top box, 1, made, preferably, in one piece or casting of steel. This box or door-piece 1 is connected to a piston-rod, which again is connected to a piston working in a cylinder, 2. This casing or door-piece fits on a projection, 3, from the press-head, on which it slides, and which acts as a guide to it. The cylinder 2 is connected by the pipe 4 to the pressure and exhaust valve M, and as the pressure is admitted into the pipe or exhausted, so the piston with its rod and the top box part, 1, rises or falls on the projection 3. Thus when one of the boxes is filled and finally upheaped through the hopper 5, that box is revolved into position between the press-head and the follower K and held there by a catch, 7. The movable and separate top box part, 1, is allowed to descend to its lowest position, thus forming one continuous box. After the cotton is thus pressed the pressure is admitted up the pipe 4 through the valve M, causing the top box part to ascend onto the projection 3, leaving the bale wholly exposed for lashing. The valve M being opened slightly, the bale is dislodged. The levers then descend, and another box, which was during the pressing of the last bale being filled, is revolved into position and retained there by the catch 7 while its cotton is pressed. These boxes revolve in the ordinary method on balls around the column 6.

The levers A A' are enabled to enter the box N on their extension by making the lower or bottom ends of the boxes, where the pressure is least, hinged and capable of closing and opening automatically. This is accomplished by making the lever 8 so that on the levers A rising against it they raise it and release the latch 9', thus allowing both bottom end doors to open out of the way of A A A' A'. These on their further extension release the two top end doors, 10 10, held by catch 9, the weight of the doors being sufficient to close them again, except the final pinch on the bottom door; and to accomplish this a spring is applied, as shown at 11.

Having now particularly described and ascertained the nature of my said invention and in what manner the same is to be performed, I declare that what I claim is—

1. In a cotton-press, the combination of double toggle-levers with the cylinders and plungers, arranged to rise and fall, as described, whereby the direction of the applied force always coincides with a straight line passing through the centers of the cylinders and the intersection of the levers with one another at the sides, substantially as hereinbefore described.

2. The rising and falling cylinders, braced together and having their pistons severally connected to a pair of toggle-levers, as shown and described.

3. The rising and falling cylinders, in combination with the bars or braces D, substantially as and for the purpose described.

4. In combination with rising and falling cylinders, and with the levers A A and A' A', the plungers bearing at their ends on the joints of such levers at B B' and giving pressure in the direction as set forth.

5. The rising and falling toggle-levers, in combination with a single cylinder-bar, I, and weight J, substantially as and for the purpose set forth.

6. In combination with the toggle-levers, the pistons, and rising and falling cylinders, an auxiliary weighted receptacle containing elastic matter or gas, as and for the purpose set forth.

7. The combination, with the toggle-levers, of steam-cylinder, weights, and casing, whereby the potential energy of the levers is utilized, as described.

8. The automatic catches for holding and releasing the ends of the box, enabling the levers to enter the same, substantially as described.

W. P. ABELL.

Witnesses:
ARTHUR C. HALL,
ALBERT E. HALL,
   *U. S. Consulate, Manchester, England.*